E. HOLMES.
Peg-Cutter.
No. 128,147.  Patented June 18, 1872.
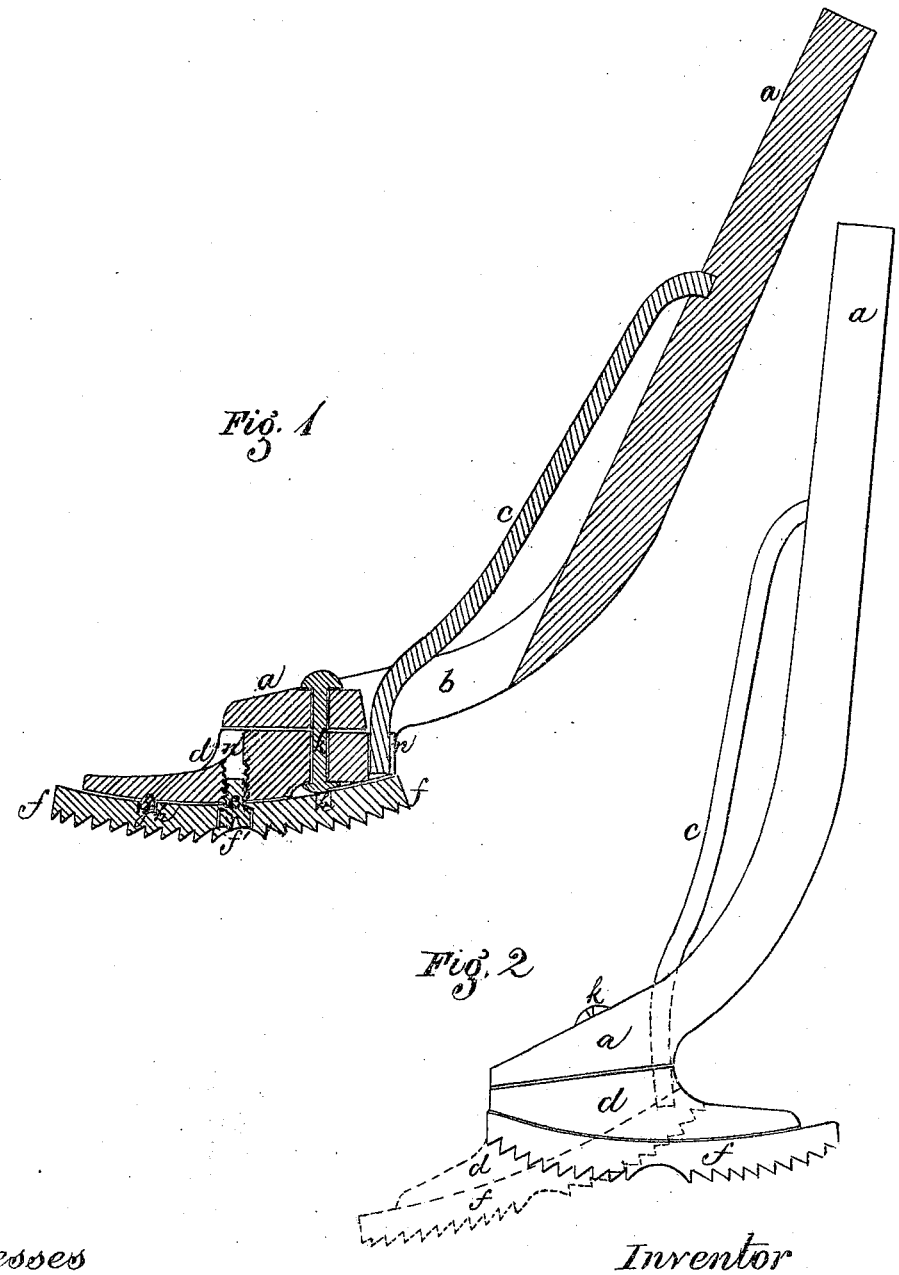
Witnesses
Sam¹ M. Barton
Jesse T. Wheeler
Inventor
Elijah Holmes
by his Atty
Carroll D. Wright

UNITED STATES PATENT OFFICE.

ELIJAH HOLMES, OF LYNN, MASSACHUSETTS.

IMPROVEMENT IN PEG-CUTTERS.

Specification forming part of Letters Patent No. 128,147, dated June 18, 1872.

SPECIFICATION.

I, ELIJAH HOLMES, of Lynn, in the county of Essex and State of Massachusetts, have invented certain Improvements in Peg-Cutters, of which the following is a specification:

Figure 1 of the accompanying drawing represents a central vertical longitudinal section, and Fig. 2 is a side view of my invention.

The nature of the present invention consists mainly in so arranging and operating an implement for cutting pegs in boots or shoes as to allow a cutter to be revolved so as to be used with equal facility either in the toe or heel of the boot or shoe, and of so forming the cutter as to lessen the expense of its construction and admit of its ready adjustment to or detachment from a plate connected with the stem of the implement.

In the drawing, $a$ represents a curved stem or bar, one end of which may be inserted in a bench, post, or handle, &c., and whose curved portion is formed with a slot, $b$, through which passes one end of a bent spring, $c$, that is held in a notch, $n$, formed in both ends of a reversible curved plate, $d$, to which is attached, by a screw, $e$, a cutter, $f$, the outer face of which is formed with proper teeth, and is countersunk in the center, as at $f'$, to receive and hold the head of the screw $e$. On the inside of the cutter $f$ are sockets $h$ for the reception of a dowel, $g$, formed on the inside of the plate $d$, which thus holds the cutter $f$, and, together with the screw $e$, prevents it from revolving independently of the plate $d$. Connected with the curved end of the stem $a$ is a stem or pivot, $k$, which passes through near the rear end of the plate $d$, which revolves on it, and is beveled or countersunk to receive the head of the pivot $k$, which is flanged over or otherwise arranged to form a bearing for the plate $d$. The plate $d$ is curved on the front, and is formed with a screw-socket which receives and holds the screw $e$.

Reference being had to the drawing, it will readily be seen that, by the arrangement of the stem or pivot $k$ near the end of the plate $d$, an eccentric movement is given to the plate, which, if turned in the direction shown in Fig. 1, and by the dotted lines in Fig. 2, carries the cutter $a$, which revolves with the plate $d$, some distance beyond the front of the stem $a$, and in the desired position to cut the pegs in the toe of the boot or shoe, and the spring $c$, engaging in the notch $n$, securely holds in place the plate $d$, and, consequently, the cutter $f$, attached to and held by the plate by means of the screw $e$ and dowel $g$, that fits into the socket $h$. If the spring $c$ is released from the notch $n$ and the plate $d$ turned in the opposite direction, it will be seen that the rear ends of the cutter $f$ and plate $d$ are even with the front end of the stem $a$, as shown by the firm lines in Fig. 2, and in the position required for the operation of the implement in the heel of a boot or shoe.

It has been customary heretofore to adjust a cutter to a plate or stem by means of two screws passing through the plate or stem and engaging in screw-threads cut in the steel cutter. This arrangement is objectionable on account of the expense incurred and the care required in so forming the screw-threads as not to interfere with the teeth of the cutter. These objections are obviated in my invention by grooving and countersinking the cutter, as at $f'$, so as to admit and form a bearing for the head of a screw, $e$, without interfering with the teeth, and by merely cutting a hole in the cutter and forming a screw-socket in the iron plate $d$ to receive the one screw $e$, by which the cutter $f$ is readily attached to or detached from the plate $d$.

Having thus fully described my improvements, what I claim as my invention, and desire to have secured to me by Letters Patent, is—

1. A peg-cutter, arranged, as hereinabove described, to allow an adjustable cutter $f$ to be revolved so as to operate either in the toe or heel of a boot or shoe, substantially as specified.

2. The revolving plate $d$, arranged and operating substantially as hereinabove described.

3. The curved stem $a$ formed with slot $b$ and provided with a bent spring, $c$, and stem or pivot $k$ operating in connection with plate $d$, substantially as hereinabove specified.

4. The adjustable cutter $f$, countersunk at $f'$ to receive and hold the head of a screw, $e$, and arranged and operating substantially as specified.

5. The combination of the bar $a$, spring $c$, plate $d$, and cutter $f$, all arranged and operating substantially as specified.

In testimony whereof I have signed my name to this specification in the presence of two subscribing witnesses.

ELIJAH HOLMES.

Witnesses:
CARROLL D. WRIGHT,
SAML. M. BARTON.